(12) United States Patent
Chi et al.

(10) Patent No.: US 9,348,425 B2
(45) Date of Patent: May 24, 2016

(54) GLASS KEYBOARD

(71) Applicant: CORNING INCORPORATED, Corning, NY (US)

(72) Inventors: Chun-Wei Chi, Taipei (TW); Jr-Nan Hu, New Taipei (TW)

(73) Assignee: Corning Incorporated, Corning, NY (US)

( * ) Notice: Subject to any disclaimer, the term of this patent is extended or adjusted under 35 U.S.C. 154(b) by 145 days.

(21) Appl. No.: 14/169,239

(22) Filed: Jan. 31, 2014

(65) Prior Publication Data

US 2014/0218640 A1 Aug. 7, 2014

Related U.S. Application Data

(60) Provisional application No. 61/760,750, filed on Feb. 5, 2013.

(51) Int. Cl.
G06F 3/041 (2006.01)
G06F 3/02 (2006.01)
(Continued)

(52) U.S. Cl.
CPC ............ *G06F 3/0202* (2013.01); *H01H 13/704* (2013.01); *H01H 2209/084* (2013.01); *H01H 2221/028* (2013.01); *H01H 2221/044* (2013.01); *H01H 2221/07* (2013.01); *H01H 2223/038* (2013.01)

(58) Field of Classification Search
CPC ....... G06F 3/0219; G06F 3/041; H01H 13/14; H01H 13/704
USPC ................................ 341/34; 349/12; 400/490
See application file for complete search history.

(56) References Cited

U.S. PATENT DOCUMENTS 4,376,239 A * 3/1983 Long .................... H01H 13/705
200/302.2
4,483,700 A 11/1984 Forker, Jr. et al.
4,490,587 A * 12/1984 Miller .................. H01H 13/702
200/5 A (Continued)

FOREIGN PATENT DOCUMENTS

CN 101719431 6/2010
DE 19958518 6/2001

(Continued)

OTHER PUBLICATIONS

CN101719431 Machine Translation.
(Continued)

*Primary Examiner* — Fekadeselassie Girma
*Assistant Examiner* — Stephen Burgdorf
(74) *Attorney, Agent, or Firm* — Timothy M. Schaeberle

(57) ABSTRACT

A glass keyboard includes a patterned glass sheet having a plurality of glass keys arranged in a keyboard layout. Each of the glass keys includes one or more cantilevered glass tabs integrally formed in the patterned glass sheet. Each glass tab is deflectable from a plane of the patterned glass sheet. A conductive layer is arranged in opposing and spaced-apart relation to the patterned glass sheet. The conductive layer has a plurality of contact pads in positions corresponding to the glass tabs. A plurality of pressure pads is disposed between the cantilevered glass tabs and the contact pads and configured to selectively transfer contact pressure from the cantilevered glass tabs to the contact pads when the cantilevered glass tabs are selectively deflected from the plane of the patterned glass sheet.

19 Claims, 9 Drawing Sheets

(51) Int. Cl.
   *H01H 13/14*       (2006.01)
   *H01H 13/704*      (2006.01)

(56) References Cited

U.S. PATENT DOCUMENTS

| | | | | |
|---|---|---|---|---|
| 4,901,074 | A * | 2/1990 | Sinn | F24C 7/082 200/5 A |
| 4,975,676 | A * | 12/1990 | Greenhalgh | B66B 1/463 200/5 A |
| 5,674,790 | A | 10/1997 | Araujo | |
| 6,380,497 | B1 * | 4/2002 | Hashimoto | G06F 3/045 200/5 A |
| 6,562,440 | B1 | 5/2003 | Tsuchiya et al. | |
| 6,563,435 | B1 | 5/2003 | Platz | |
| 6,617,983 | B1 | 9/2003 | Platz | |
| 7,666,511 | B2 | 2/2010 | Ellison et al. | |
| 2004/0256203 | A1 * | 12/2004 | Pihlaja | H01H 13/7013 200/5 A |
| 2010/0117967 | A1 | 5/2010 | Wang et al. | |
| 2012/0043191 | A1 * | 2/2012 | Kessler | H01H 3/125 200/5 A |
| 2013/0298608 | A1 * | 11/2013 | Langsdorf | C03B 23/0258 65/103 |
| 2013/0321288 | A1 * | 12/2013 | Adamson | G06F 3/041 345/173 |

FOREIGN PATENT DOCUMENTS

| | | | |
|---|---|---|---|
| DE | 19958506 | 7/2001 | |
| DE | 10107975 | 10/2002 | |
| EP | 2187293 | 5/2010 | |
| IT | EP 1983535 A2 * | 10/2008 | ........... H01H 13/703 |
| WO | 99/46725 | 9/1999 | |
| WO | 00/72345 | 11/2000 | |

OTHER PUBLICATIONS

DE10107975 Machine Translation.
DE19958506 Machine Translation.
DE19958518 Machine Translation.
EP2187293 Machine Translation.
WO099/46725 Machine Translation.
WO00/72345 Machine Translation.

* cited by examiner

GLASS KEYBOARD

CROSS-REFERENCE TO RELATED APPLICATIONS

This application claims the benefit of priority under 35 U.S.C. §119 of U.S. Provisional Application Ser. No. 61/760,750 filed on Feb. 5, 2013, the content of which is relied upon and incorporated herein by reference in its entirety.

FIELD

The field relates to computer keyboards. The field further relates to a computer keyboard with a keyboard surface made from glass.

BACKGROUND

U.S. Pat. No. 6,563,435 (Platz, 2003) discloses a glass keyboard having a keyboard surface made from a flexible thin glass pane. A carrier material pane is arranged in opposing relation to the flexible thin glass pane, and the carrier material pane and glass plane are separated from each other by means of a spacer. The inner opposing surfaces of the panes are provided with electroconductive layers, which form electrodes and establish a switching contact when they touch. The flexible thin glass pane can be deformed by applying localized pressure such that the electroconductive layers contact and establish the switching contact. A receiving means for an exchangeable insert is arranged on the side of the carrier material pane away from the flexible thin glass pane. The insert serves for the marking of keyboard fields of the keyboard surface. The carrier material pane is preferably made of a transparent material such as glass so that the markings behind the carrier material pane are visible.

SUMMARY

In one aspect, the present disclosure describes a glass keyboard including a patterned glass sheet having a plurality of glass keys arranged in a keyboard layout. Each of the glass keys includes one or more cantilevered glass tabs, which are integrally formed in the patterned glass sheet and deflectable from a plane of the patterned glass sheet. The glass keyboard further includes a conductive layer arranged in opposing and spaced-apart relation to the patterned glass sheet. The conductive layer has a plurality of contact pads in positions corresponding to the glass tabs. The glass keyboard further includes a plurality of pressure pads disposed between the cantilevered glass tabs and the contact pads and configured to selectively transfer contact pressure from the cantilevered glass tabs to the contact pads when the cantilevered glass tabs are selectively deflected from the plane of the patterned glass sheet.

In one or more embodiments, a plurality of slots provided in the patterned glass sheet defines the cantilevered glass tabs in the patterned glass sheet.

In one or more embodiments, the glass keyboard further includes a protective layer applied to a side of the patterned glass sheet.

In one or more embodiments, the protective layer comprises a sheet of film having a plurality of portions configured to deflect with the cantilevered glass tabs.

In one or more embodiments, the protective layer comprises a plurality of film tabs individually applied to the cantilevered glass tabs.

In one or more embodiments, the protective layer comprises character printings corresponding to the glass keys.

In one or more embodiments, the protective layer comprises an opaque or semi-opaque film.

In one or more embodiments, the protective layer comprises a hard coat film.

In one or more embodiments, the patterned glass sheet has a thickness of less than 2.0 mm.

In one or more embodiments, the patterned glass sheet has a surface compressive strength of at least 300 MPa.

In one or more embodiments, the patterned glass sheet has a compressively stressed region near at least one of its surfaces, and a layer depth of the compressively stressed region is at least 20 microns.

In one or more embodiments, the patterned glass sheet is made of a chemically strengthened glass.

In one or more embodiments, the pressure pads are made of an elastic material.

In one or more embodiments, the pressure pads are collapsible.

In one or more embodiments, a tip structure is attached to each pressure pad for contacting the corresponding contact pad of the conductive layer when the corresponding cantilevered glass tab is deflected against the pressure pad.

In one or more embodiments, the tip structure is made of an elastomer or metal.

In one or more embodiments, the glass keyboard further comprises a plurality of walls positioned to support the patterned glass sheet at areas of the patterned glass sheet in between the cantilevered glass tabs.

In one or more embodiments, the walls and pressure pads are arranged in a single layer between the patterned glass sheet and the conductive layer.

In one or more embodiments, the walls and pressure pads are arranged on a flexible pad, and the pressure pads are configured to selectively deflect portions of the flexible pad against the contact pads.

In one or more embodiments, the glass keyboard further comprises a glass touchpad surface defined in the patterned glass sheet and a touchpad sensor layer underneath the glass touchpad surface, the glass touchpad surface and touchpad sensor layer forming a touch pad.

In one or more embodiments, the patterned glass sheet further comprises at least one glass button adjacent to the glass touchpad surface, the at least one glass button comprising one or more cantilevered glass tabs formed integrally in the patterned glass sheet.

A glass keyboard such as described above may be integrated into the base housing of a computer or used as an extended keyboard that can communicate with a computer via a cable or wirelessly. In some embodiments, if the glass keyboard is integrated into the base housing of a notebook computer, or other computer form requiring an integrated keyboard, the patterned glass sheet of the glass keyboard may function as a seamless cover for the base housing, providing the keyboard, palm rest, and touchpad on the same surface.

The keys of a glass keyboard such as described above may be formed in a thin glass sheet, which may have the advantage of reducing the overall thickness, and possibly weight, of the glass keyboard compared to conventional keyboards.

In capacitive-type keyboards where pressing of keys changes the capacitation of a pattern of capacitor pads, keys do not need to be fully pressed to generate key press events. This often requires that users hover their hands over keys when it is not desired to generate key press events. In a glass keyboard such as described above, users may rest their hands on the glass keys without creating any unintended key press events. Key press events will typically not be generated until the cantilevered glass tabs are deliberately deflected to apply appropriate contact pressure to the corresponding contact pads on the conductive layer.

It is to be understood that both the foregoing general description and the following detailed description are exemplary and are intended to provide an overview or framework for understanding the nature and character of the claimed invention. The accompanying drawings are included to provide a further understanding of the invention and are incorporated in and constitute a part of this specification.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1A:
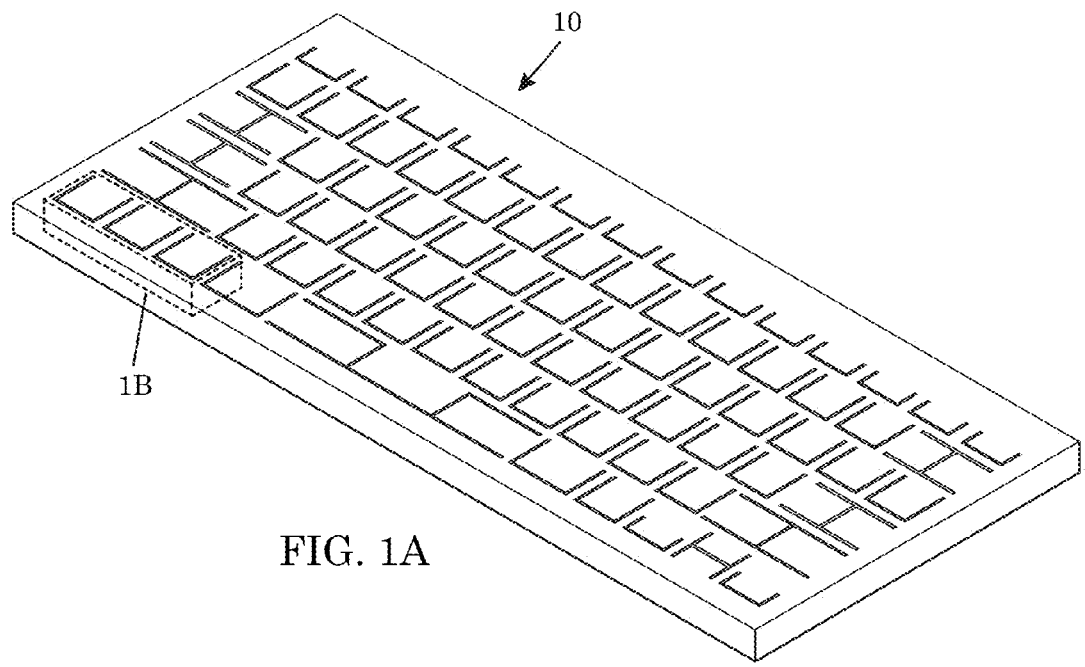
FIG. 1A is a perspective view of a glass keyboard.

In the following detailed description, numerous specific details may be set forth to provide a thorough understanding of embodiments. However, it will be clear to one skilled in the art when the embodiments may be practiced without some or all of these specific details. In other instances, well-known features or processes may not be described in detail so as not to unnecessarily obscure the invention. In addition, like or identical reference numerals may be used to identify common or similar elements.

Figure 1B:
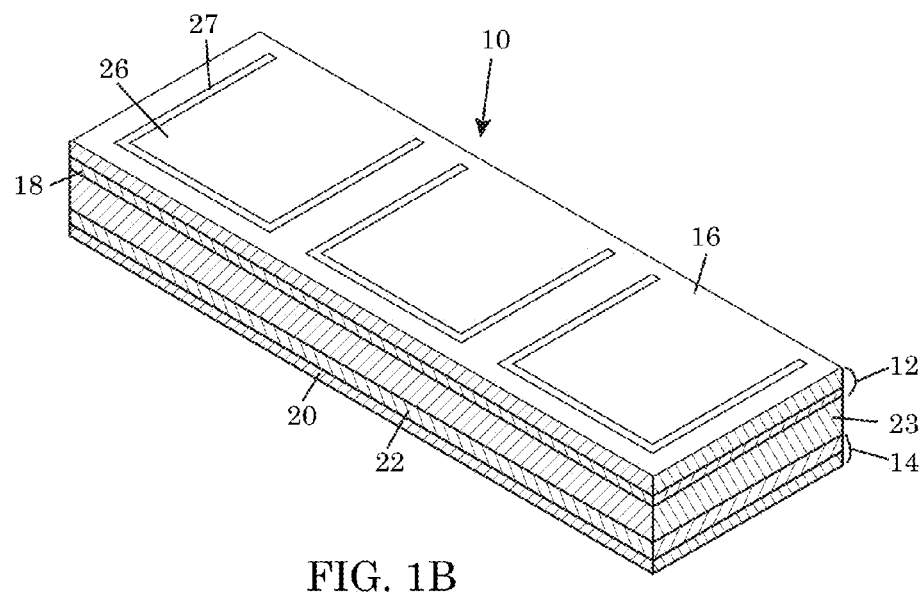
FIG. 1B is an enlarged section of the glass keyboard of FIG. 1A in volume 1B.

FIG. 1A shows an illustrative glass keyboard 10 for use with a computer. A small volume 1B of the glass keyboard 10 is shown in FIG. 1B for the purposes of describing the layers in the glass keyboard 10. In FIG. 1B, the glass keyboard 10 includes a keyboard top 12 and a keyboard bottom 14 arranged in opposing relation and separated by a support structure 23. The keyboard top 12 includes a patterned glass sheet 16 with integrated glass keys and may further include a protective layer 18 underneath the patterned glass sheet 16. The protective layer 18 may contain character printings, such as would be found on a standard keyboard (see, e.g., FIGS. 4A and 4B). Alternately, a surface of the patterned glass sheet 16, such as the surface adjacent to the protective layer 18, may contain the character printings.

The keyboard bottom 14 includes a carrier plane or base plate 20, which may be made of a variety of materials, such as plastic, glass, or metal. The keyboard bottom 14 further includes an electrically conductive layer 22 supported on the carrier plane 20. The conductive layer 22 contains the control circuitry for the glass keyboard 10. The conductive layer 22 may have contact pads corresponding to the glass keys of the patterned glass sheet 16. Pressure pads are arranged between the keyboard top 12 and the keyboard bottom 14 in positions corresponding to the contact pads of the conductive layer 22 and the glass keys of the patterned glass sheet 16. The pressure pads are pads that can be used to selectively transmit contact pressure from the glass keys of the patterned glass sheet 16 to the contact pads of the conductive layer 22.

Figure 2:
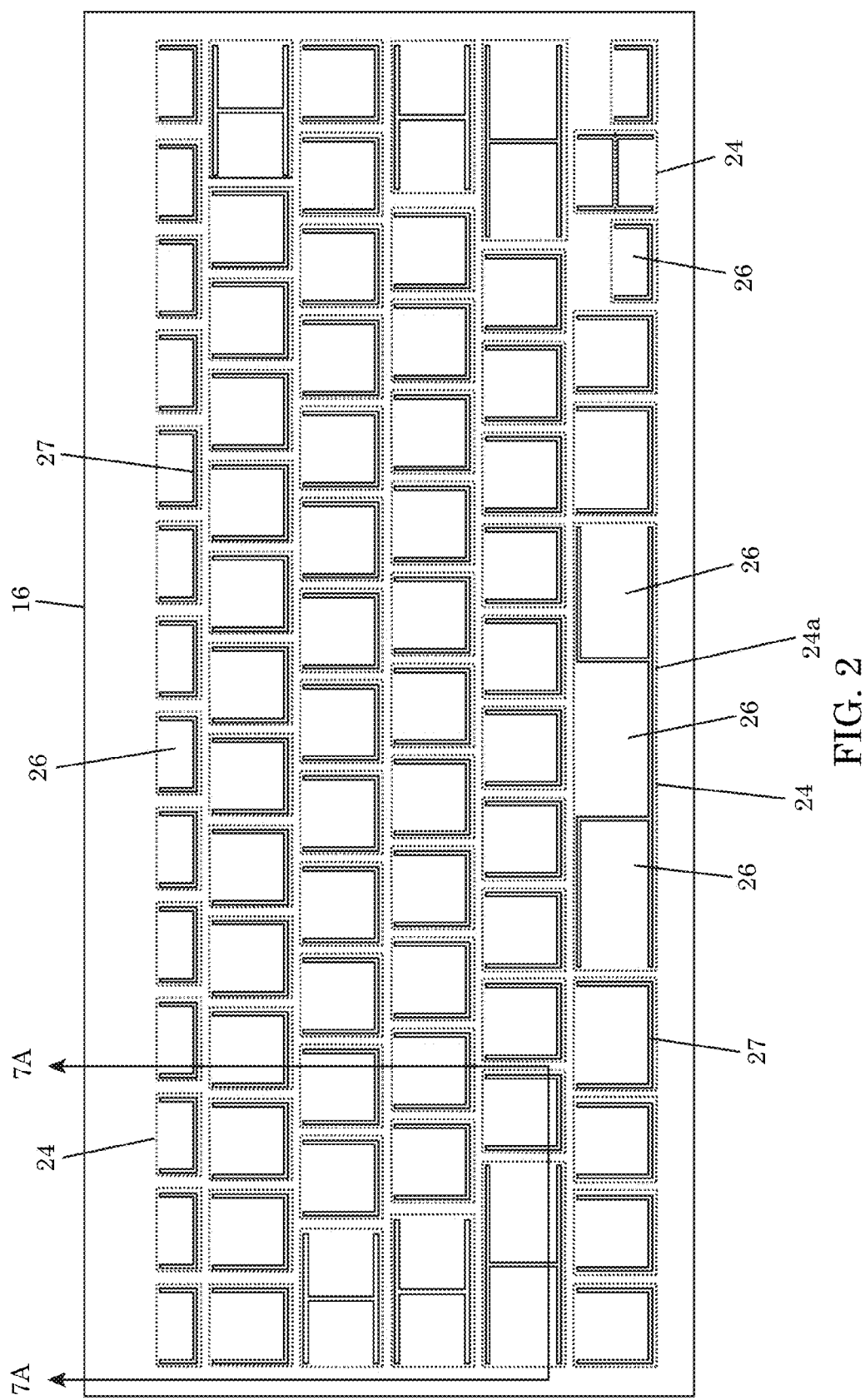
FIG. 2 is a top view of a patterned glass sheet having a keyboard layout.

Referring to FIG. 2, the patterned glass sheet 16 includes glass keys 24 of various sizes arranged to form a keyboard layout, which may be any standard keyboard layout configured for any desired locale. The dotted lines demarcating the glass keys 24 are imaginary lines and are used merely to facilitate discussion. Each glass key 24 is made of one or more cantilevered glass tabs 26, which are integral sections of the patterned glass sheet 16. Slots 27 formed in the patterned glass sheet 16 define the glass tabs 26. The slots 27 may be formed in the glass sheet 16 by selective etching of the glass sheet using a suitable mask. It is also possible to form the slots 27 in the glass sheet 16 by other methods, such as laser cutting, mechanical cutting, and the like. The slots 27 do not have closed shapes, which results in the glass tabs 26 formed in the patterned glass sheet 16 being cantilevered. Any suitable slot pattern may be used to form the cantilevered glass tabs 26 in the glass sheet 16. Examples of slot patterns are shown in FIGS. 3A-3C.

Figure 3A:
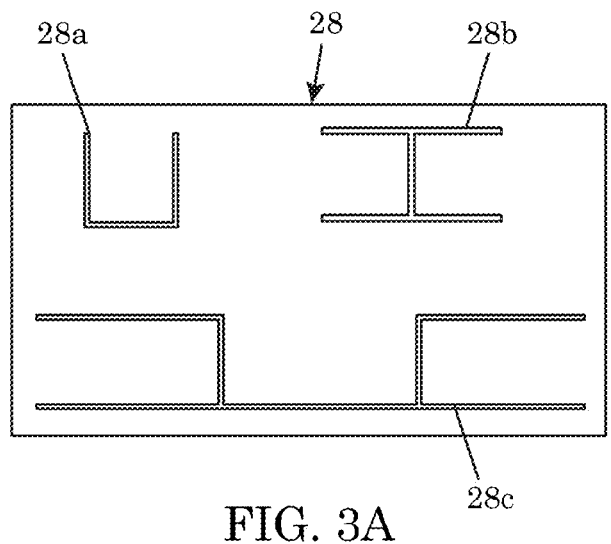
FIGS. 3A-3C are slot patterns.

FIG. 3A shows an illustrative slot pattern 28 including slot shapes 28a, 28b, 28c, several of which may be combined in any desired manner and size to form glass tabs corresponding to glass keys in a desired keyboard layout. The slot shape 28a will form a single glass tab. The slot shape 28b will form a group of two glass tabs. The slot shape 28c will form a group of three glass tabs. The glass tab formed by the slot shape 28a may correspond to one key in the keyboard layout. Each group of glass tabs formed by the slot shapes 28b, 28c may correspond to one key or an adjacent set of keys in the keyboard layout. The glass tabs formed by the slot shapes 28a, 28b, 28c may be square or rectangular in shape. The corners of the slot shapes 28a, 28b, 28c may be rounded such that the glass tabs formed are free of sharp corners. The illustrative slot pattern 28 is used in the illustrative patterned glass sheet 16 of FIG. 2.

Figure 3B:
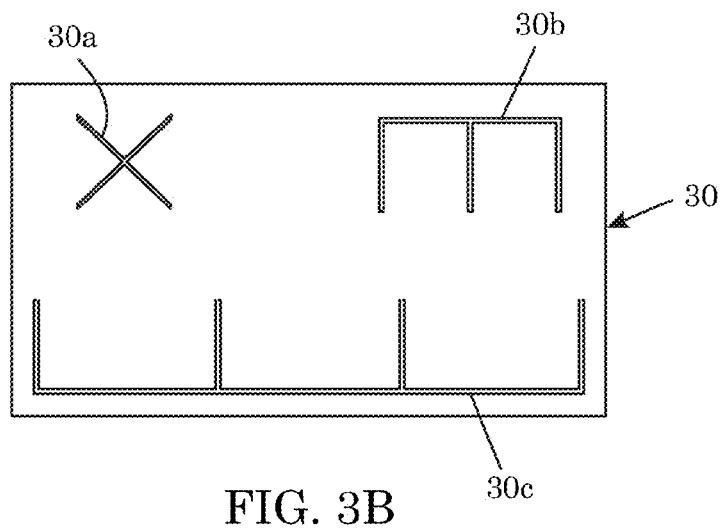

FIG. 3B shows another illustrative slot pattern 30 including slot shapes 30a, 30b, 30c, several of which may be combined in any desired manner to form glass tabs corresponding to glass keys in a desired keyboard layout. The slot shape 30a will form a group of four glass tabs. The slot shape 30b will form a group of two glass tabs. The slot shape 30c will form a group of three glass tabs. Each group of glass tabs formed by the slot shapes 30a, 30b, 30c may correspond to one key or a set of adjacent keys in the keyboard layout. The glass tabs formed by the slot shapes 30a, 30b, 30c may be triangular, square, or rectangular in shape. The corners of the slot shapes 30a, 30b, 30c may be rounded such that the glass tabs formed are free of sharp corners.

Figure 3C:
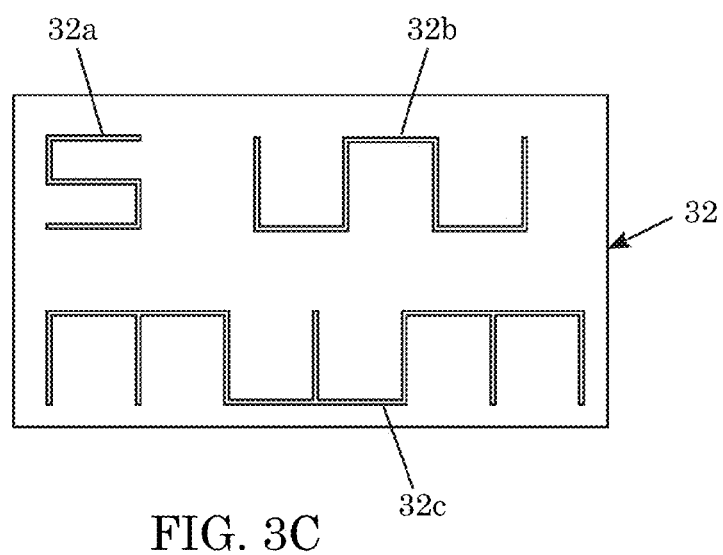

FIG. 3C shows yet another illustrative slot pattern 32 including slot shapes 32a, 32b, 32c, several of which may be combined in any desired manner to form glass tabs corresponding to glass keys in a desired keyboard layout. The slot shape 32a will form a group of two glass tabs. The slot shape 32b will form a group of three glass tabs. The slot shape 32c will form a group of six glass tabs. Each group of glass tabs formed by the slot shapes 32a, 32b, 32c may correspond to one key or a set of adjacent keys in the keyboard layout. The glass tabs formed by the slot shapes 32a, 32b, 32c may be square or rectangular in shape. The corners of the slot shapes 32a, 32b, 32c may be rounded such that the glass tabs formed are free of sharp corners.

Figure 4A:
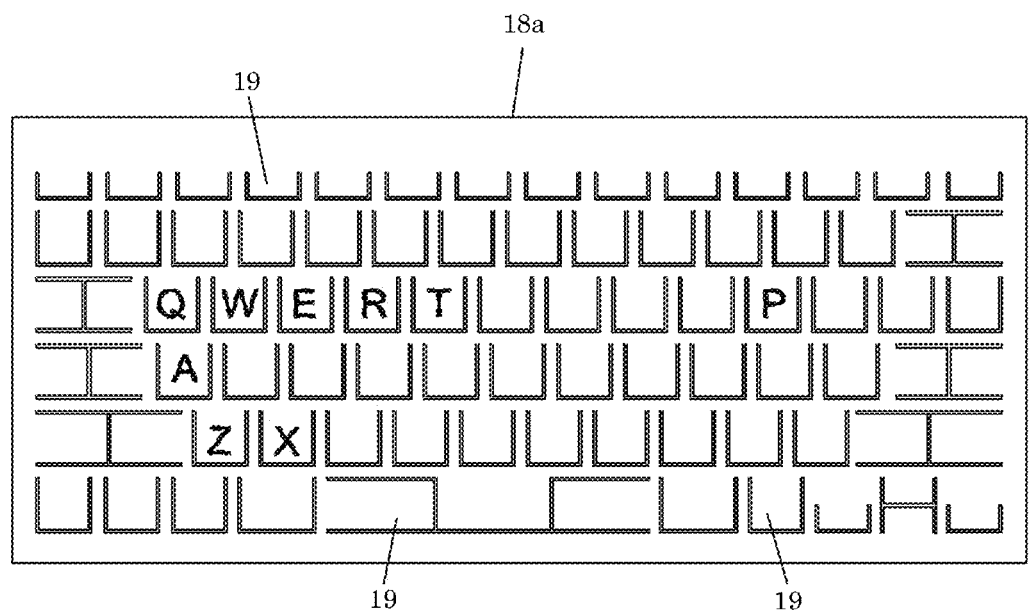
FIG. 4A is a top view of a patterned film sheet having a keyboard layout.
Figure 4B:
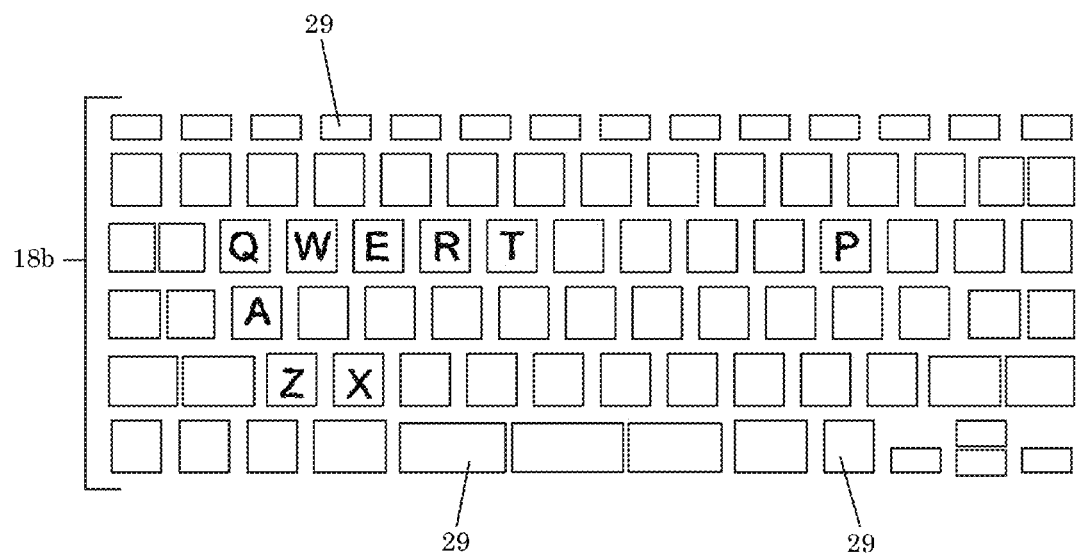
FIG. 4B is a top view of a set of film tabs.

Returning to FIG. 2, the cantilevered glass tabs 26 normally rest in the plane of the patterned glass sheet 16. During use of the keyboard, any of the cantilevered glass tabs 26 can be deflected off the plane of the patterned glass sheet 16 by force or contact pressure. If the protective layer 18 (in FIG. 1B) is provided underneath the patterned sheet 16, it would be necessary to ensure that the protective layer 18 does not hinder deflection of the glass tabs 26 from the plane of the patterned glass sheet 16. In one embodiment, the protective layer 18 is in the form of a patterned film sheet that can be applied to the patterned glass sheet 16. FIG. 4A shows such a patterned film sheet 18a having a slot pattern matching the slot pattern of the patterned glass sheet 16 (in FIG. 2), which would allow the patterned film sheet 18a to have deflectable portions 19 where the patterned glass sheet 16 has deflectable glass tabs 26 (in FIG. 2). In another embodiment, the protective layer 18 is in the form of a set of film tabs that can be applied to the patterned glass sheet 16. FIG. 4B shows such a film tab set 18b with individual film tabs 29, each of which may be applied to an individual glass tab 26 (in FIG. 2) in the patterned glass sheet 16.

Figure 4C:
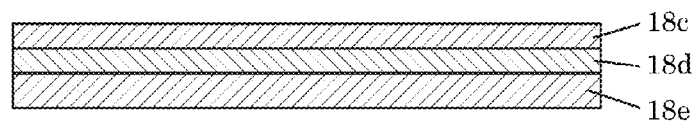
FIG. 4C is a cross-section illustrating a protective layer structure.

In one or more embodiments, the protective layer 18, either in the form of the patterned film sheet 18a or film tabs 29, has a multilayered structure. In FIG. 4C, for example, the protective layer 18 may have a character layer 18c, a base color layer 18d, and a base film layer 18e. The character layer 18c contains character printings. Some examples of character printings are shown in FIGS. 4A and 4B for illustration purposes. When the protective layer 18 is placed underneath the patterned glass sheet 16 (in FIGS. 1B and 2), the character printings will be adjacent to the appropriate glass tabs 26 (in FIGS. 1B and 2). If the glass tabs 26 are transparent, which would normally be the case, the character printings will be visible from the top of the glass keyboard 10 (in FIG. 1A). Although, as mentioned earlier, the character printings may alternately be formed on the glass tabs 26, i.e., the protective layer 18 may not include a character layer in alternate embodiments. It is also not necessary to have a character printing adjacent to every glass tab 26 or glass key 24 (in FIG. 2). For example, the glass key 24a (in FIG. 2), which is usually the space bar on many keyboard layouts, does not typically require identification by character printing.

The base color layer 18d is a film or coating having an opaque or semi-opaque color, rendering the protective layer 18 effectively opaque or semi-opaque. When the protective layer 18 is placed underneath the patterned glass sheet 16 (in FIGS. 1B and 2), the order of the layers will be patterned glass sheet 16, followed by character layer 18c, followed by base color layer 18d, followed by base film layer 18e. The base color layer 18d will hide the components below the protective layer 18. Typically, the color of the baser color layer 18d will be black, although other colors may be used for aesthetic purposes. The base film layer 18e is a film made of a flexible material, typically a polymer material such as polyethylene terephthalate (PET). The base film layer 18e is the layer that will come into contact with pressure pads that will be further described below.

Figure 4D:
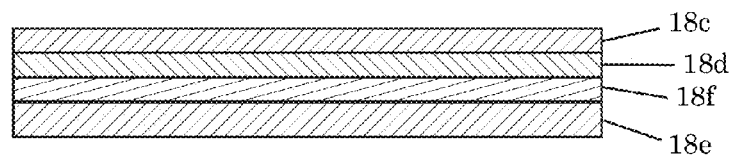
FIG. 4D is a cross-section illustrating another protective layer structure.

The protective layer 18 may be configured to protect the patterned glass sheet 16 from shattering. This can be done, for example, by configuring the base color layer 18d as a hard coat film or by applying a hard coat film to the base film layer 18e. FIG. 4D shows the latter example, with the hard coat film 18f applied to the film layer 18e. The hard coat film may be any of those suitable for use in touch panels. Thermoplastic resins and the like could be used as materials for the hard coat film. For example, U.S. Pat. No. 6,562,440 describes hard coat films that may be used in the protective layer 18. In one or more embodiments, the hard coat film is flexible so that the overall protective layer 18 is flexible and would deflect easily with the cantilevered glass tabs.

Figure 5A:
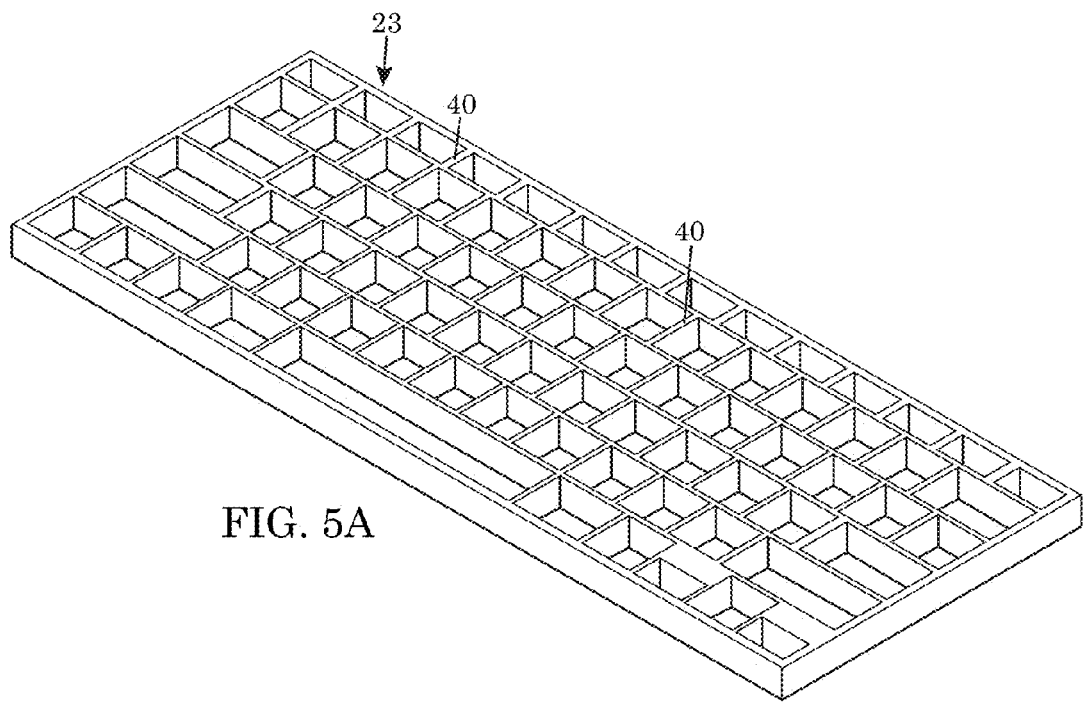
FIG. 5A is a perspective view of a support structure.
Figure 5B:
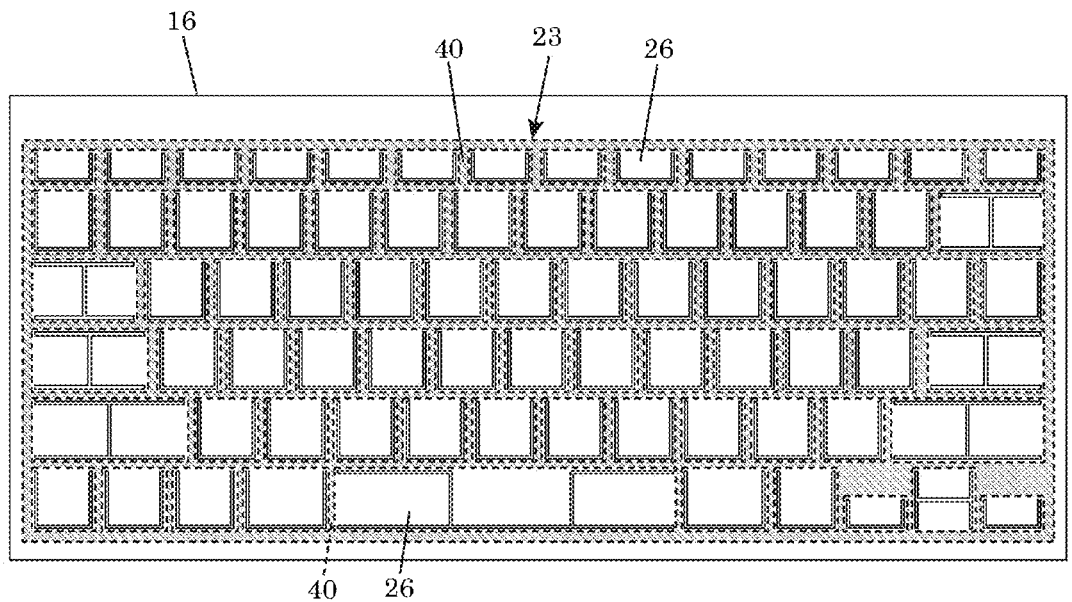
FIG. 5B is a top view showing the support structure of FIG. 5A below the patterned glass sheet of FIG. 2.

FIG. 5A shows one embodiment of the support structure 23 with vertical walls 40. In FIG. 5A, the vertical walls 40 are interconnected to form a single honeycomb-like structure. In alternate embodiments, the vertical walls 40 may not be interconnected to form a single structure and may instead be configured to form multiple substructures, such as three-walled or four-walled substructures. When the support structure 23 is sandwiched between the keyboard top 12 (in FIG. 1B) and keyboard bottom 14 (in FIG. 1B), the keyboard top 12 will rest on the walls 40. As shown in FIG. 5B, the walls 40 will be aligned with the areas of the patterned glass sheet 16 between the glass tabs 26, which would allow the glass tabs 26 to be deflected without interruption by the walls 40. Typically, the patterned glass sheet 16 will have many closely-spaced slots to form the numerous glass tabs 26. The spacing between the resulting glass tabs can be as little as 0.2 cm to 0.3 cm, for example. Therefore, the support structure 23 will be useful in supporting the patterned glass sheet 16 and preventing the patterned glass sheet 16 from collapsing while the glass tabs 26 are being deflected. The walls 40 may be made of an elastomer, such as rubber, or other suitable supporting material that would not damage the material of the protective layer 18 (in FIG. 1B) or patterned glass sheet 16.

Figure 6A:
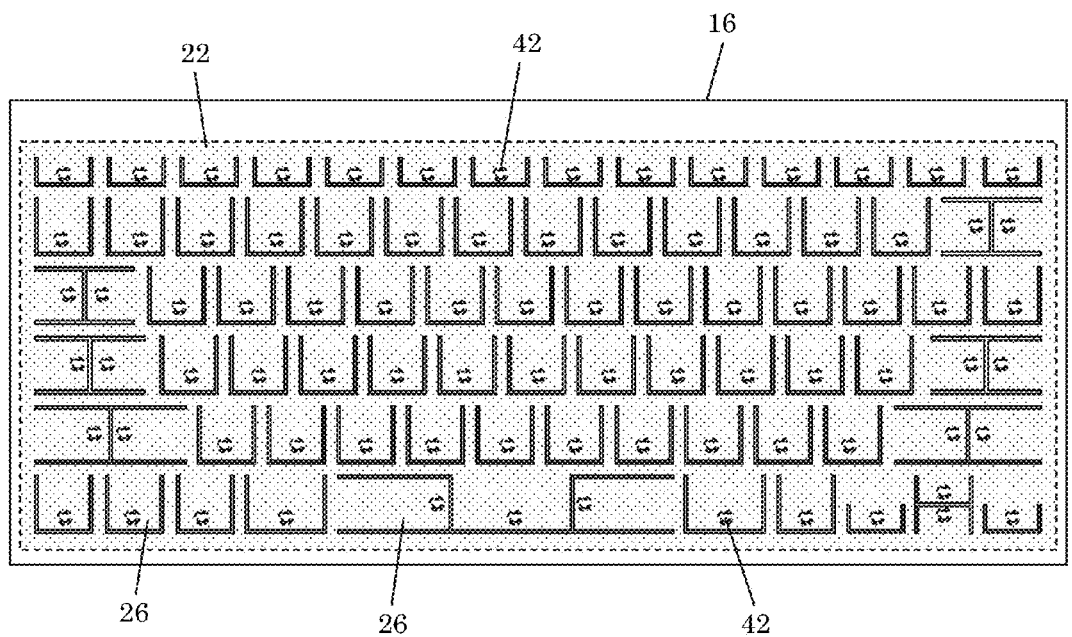
FIG. 6A is a top view showing pressure pads below the patterned glass sheet of FIG. 2.

FIG. 6A shows several pressure pads 42 arranged above the conductive layer 22. When the glass keyboard 10 (in FIG. 1) is assembled, each pressure pad 42 will be aligned with a glass tab 26 in the patterned glass sheet 16 and a contact pad in the conductive layer 22. Typically, there will be a one-to-one correspondence between each pressure pad 42 and each glass tab 26 in the patterned glass sheet 16. However, it is possible in alternate embodiments to have one pressure pad 42 corresponding to a group of glass tabs 26 associated with a single glass key 24 (see 24 in FIG. 2).

Figure 6B:
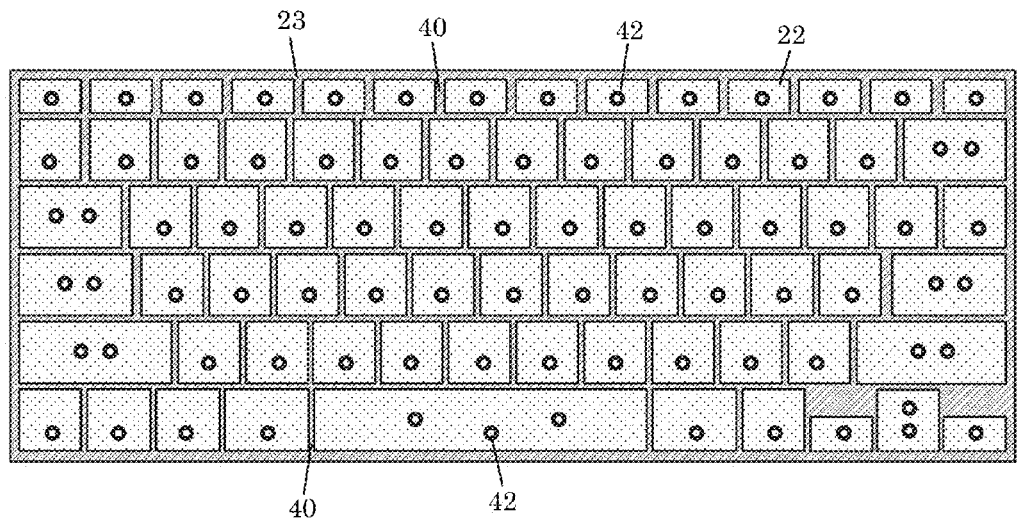
FIG. 6B is a top view showing the pressure pads of FIG. 6A and the support structure of FIG. 5A in a single layer.

The pressure pads 42 and support structure 23 may be arranged on the same layer. As shown in FIG. 6B, when the pressure pads 42 and support structure 23 are on the same layer, the pressure pads 42 may be located between the walls 40 of the support structure 23. In some embodiments, the support structure 23 and the pressure pads 42 may be formed as an integral body. For example, the integral structure may be such that the bases of the pressure pads 42 are connected to the bases of the walls 40. Stated differently, the walls 40 and pressure pads 42 may have their bases molded or joined to a common sheet or pad. In general, any integral structure used should allow individual compression of the pressure pads 42, the reason for which will be apparent shortly.

Figure 7A:
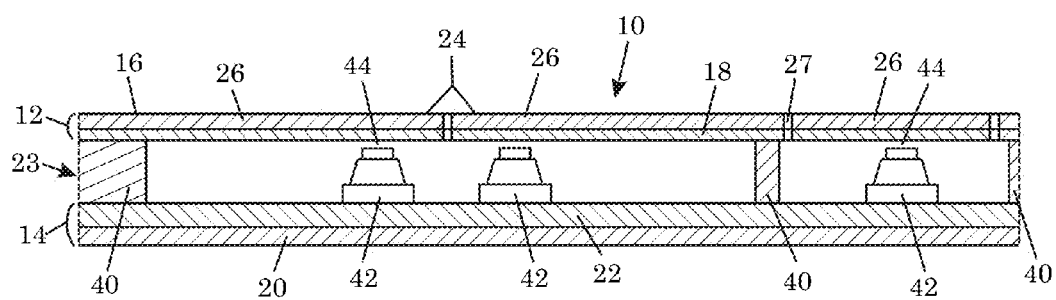
FIG. 7A is a cross-section of FIG. 2 along line 7A-7A.

Referring to FIG. 7A, the arrangement of the pressure pads 42 between the keyboard top 12 and the keyboard bottom 14 may be such that there is some space 44 between the top of the pressure pads 42 and the bottom of the glass tabs 26 when the glass tabs 26 are undeflected. The glass tabs 26 will have to deflect through the space 44 to reach the pressure pads 42. Typically, this means that the pressure pads 42 are shorter than the walls 40 that define the spacing between the keyboard top 12 and the keyboard bottom 14. In one or more embodiments, the pressure pads 42 are compressible such that they can transfer contact pressure from deflected glass tabs 26 to the contact pads on the conductive layer 22. In one or more embodiments, the pressure pads 42 are also elastic such that they can spring back after the compression force is removed. The pressure pads 42 may be made from an elastic or springy material such as an elastomer, e.g., rubber or silicone. To facilitate collapse of the pressure pads 42, the pressure pads 42 may further have a hollow interior and/or a generally tapered or dome-like shape. Other compressible and springy structures besides the one just described may also be used for the pressure pads 42.

Figure 7B:
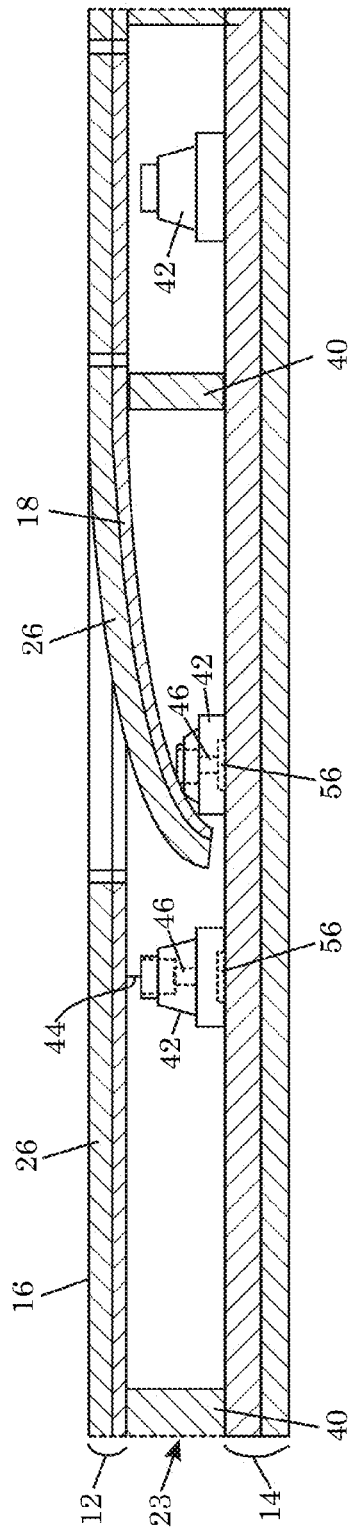
FIG. 7B is a cross-section illustrating deflection of a glass tab against a pressure pad.

When using the glass keyboard 10, force or contact pressure can be applied to a glass tab 26 corresponding to a particular glass key 24 to deflect the glass tab 26 from the plane of the patterned glass sheet 16 towards a corresponding pressure pad 42, as shown in FIG. 7B. The glass tab 26 can be deflected sufficiently to contact and compress the pressure pad 42. When the pressure pad 42 is compressed sufficiently, the pressure pad 42 will push against a corresponding contact pad 56 of the conductive layer 22. This will cause the resistance at the contact pad 56 to change, leading to a corresponding change in signal voltage across the contact pad 56. A controller in the conductive layer 22 will detect the change in signal voltage. Ultimately, the controller will send an appropriate signal to the computer associated with the glass keyboard 10 indicating that the particular glass key 24 has been pressed or is being held down. The protective layer 18 will act as a protective buffer between the surface of the glass tab 26 and the pressure pad 42 when the glass tab 26 is deflected against the pressure pad 42.

In one embodiment, a tip structure 46 is provided inside the pressure pad 42, typically near the top of the pressure pad 42. The tip structure 46 is in opposing relation to the corresponding contact pad 56 of the conductive layer 22. The tip structure 46 is retracted from the contact pad 56 when the pressure pad 42 is not compressed. When the pressure pad 42 is compressed, the tip structure 46 will be pushed towards the contact pad 56. When the pressure pad 42 is sufficiently compressed, the tip structure 46 will apply contact pressure to the contact pad 56, which would result in a change in resistance at the contact pad 56 as explained above. The tip structure 46 may be made of elastomer or metal. Metal, compared to elastomer, may give a stronger tactile response that the key has been pressed when the tip structure 46 applies the contact pressure to the contact pad 56.

Figure 7C:
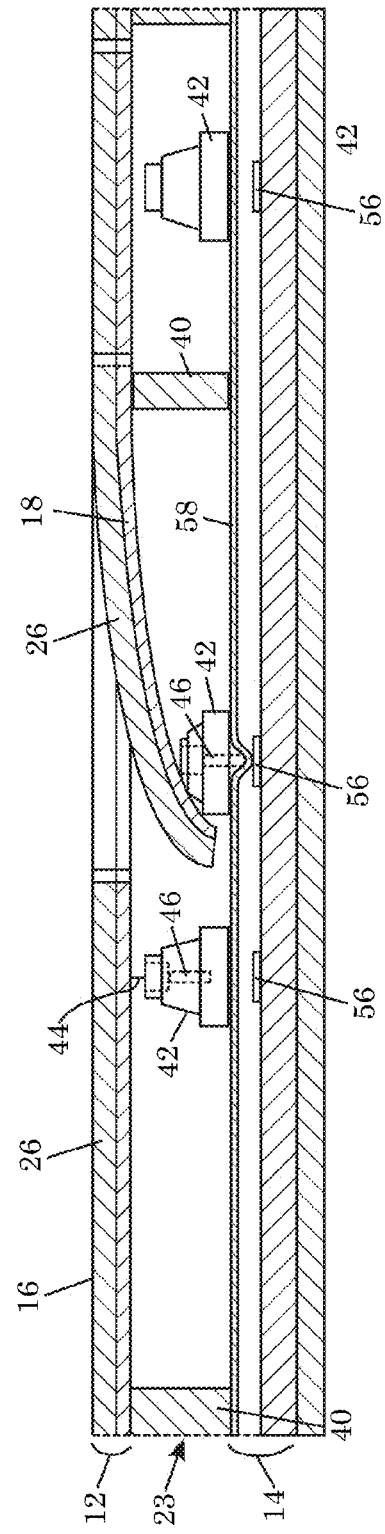
FIG. 7C is a cross-section illustrating deflection of a flexible pad against a pressure pad on a conductive layer.

In some embodiments, as shown in FIG. 7C, the pressure pads 42 and walls 40 are arranged on, or integrated with, a flexible pad 58 that is positioned above the conductive layer 22. The flexible pad 58 may be made of an elastomer, such as rubber or silicone. When the pressure pad 42 is compressed, the tip structure 46 will deflect the flexible pad 58 into contact with the contact pad 56 of the conductive layer 22. Thus the tip structure 46 may apply contact pressure to the contact pad 56 with or without making direct contact with the contact pad 56. If the tip structure 46 is made of metal, the flexible pad 58 when used may serve to protect the contact pad 56 from hard metal contact.

When the deflection force is removed from the glass tab 26, the pressure pad 42 will spring back due to its elasticity, pushing the glass tab 26 back into the plane of the patterned glass sheet 16 (see FIG. 7A). Spring-back of the pressure pad 42 will also remove contact pressure from the corresponding contact pad 56 of the conductive layer 22, which will signal to the computer associated with the keyboard that the previously pressed-down or held-down glass key 24 has been released.

Returning to FIG. 2, the patterned glass sheet 16 is preferably flexible. The flexibility of the patterned glass sheet 16 will allow the cantilevered glass tabs 26 to be deflected repeatedly within a predetermined range of deflection in a specified direction without breaking the glass tabs 26 off the glass sheet. The flexibility of the patterned glass sheet 16 is both a function of glass properties and thickness of the glass sheet 16. In one embodiment, the thickness of the glass sheet 16 is less than 2.0 mm. In another embodiment, the thickness of the glass sheet 16 is 1.0 mm or less. In some embodiments, the glass sheet 16 may have a thickness greater than 2.0 mm while still being flexible. In general, the thickness of the glass sheet 16 will not be greater than 5.0 mm. In one embodiment, the glass sheet 16 has a surface compression strength of at least 300 MPa. In one embodiment, the surface compression strength is due to the presence of a compressively stressed region near at least one of the surfaces of the glass sheet 16. The surface compression strength of the glass sheet will generally be a function of the glass composition and the layer depth, or thickness, of the compressively stressed region. In one embodiment, the layer depth of the compressively stressed region is at least 20 microns. In another embodiment, the layer depth of the compressively stressed region is greater than 30 microns.

The compressively stressed region(s) may be formed in the glass sheet 16 before or after etching or cutting or otherwise forming the slots that result in the cantilevered glass tabs 26 in the glass sheet. Chemical strengthening, e.g., ion-exchange, or thermal strengthening may be used to form the compressively stressed region(s). If ion-exchange is used to form the compressively stressed region(s), the glass sheet will need to have an ion-exchangeable glass composition. Examples of ion-exchangeable glasses that can be made with the properties described above can be found in the patent literature, e.g., U.S. Pat. No. 7,666,511 (Ellison et al; 20 Nov. 2008), U.S. Pat. No. 4,483,700 (Forker, Jr. et al.; 20 Nov. 1984), and U.S. Pat. No. 5,674,790 (Araujo; 7 Oct. 1997), and are also available from Corning Incorporated under the trade name GORILLA® glass. Typically, these ion-exchangeable glasses are alkali-aluminosilicate glasses or alkali-aluminoborosilicate glasses. In one or more embodiments, the patterned glass sheet 16 is made of a chemically strengthened or ion-exchanged glass.

The glass keyboard 10 shown in FIG. 1A and further described in FIGS. 1B-7C may be used as a standalone keyboard that can communicate with a computer via an external cable or wirelessly. Alternatively, the glass keyboard 10 may be a keyboard module to be integrated into the base housing of a notebook computer or other computer requiring an integrated keyboard. The glass keyboard 10 may also be modified to include touchpad functionality. When the glass keyboard 10 is integrated in a base housing of a notebook computer, the patterned glass sheet, particularly if it includes touchpad functionality and palm rests as will be explained below, may function as a seamless cover for the base housing.

Figure 8:
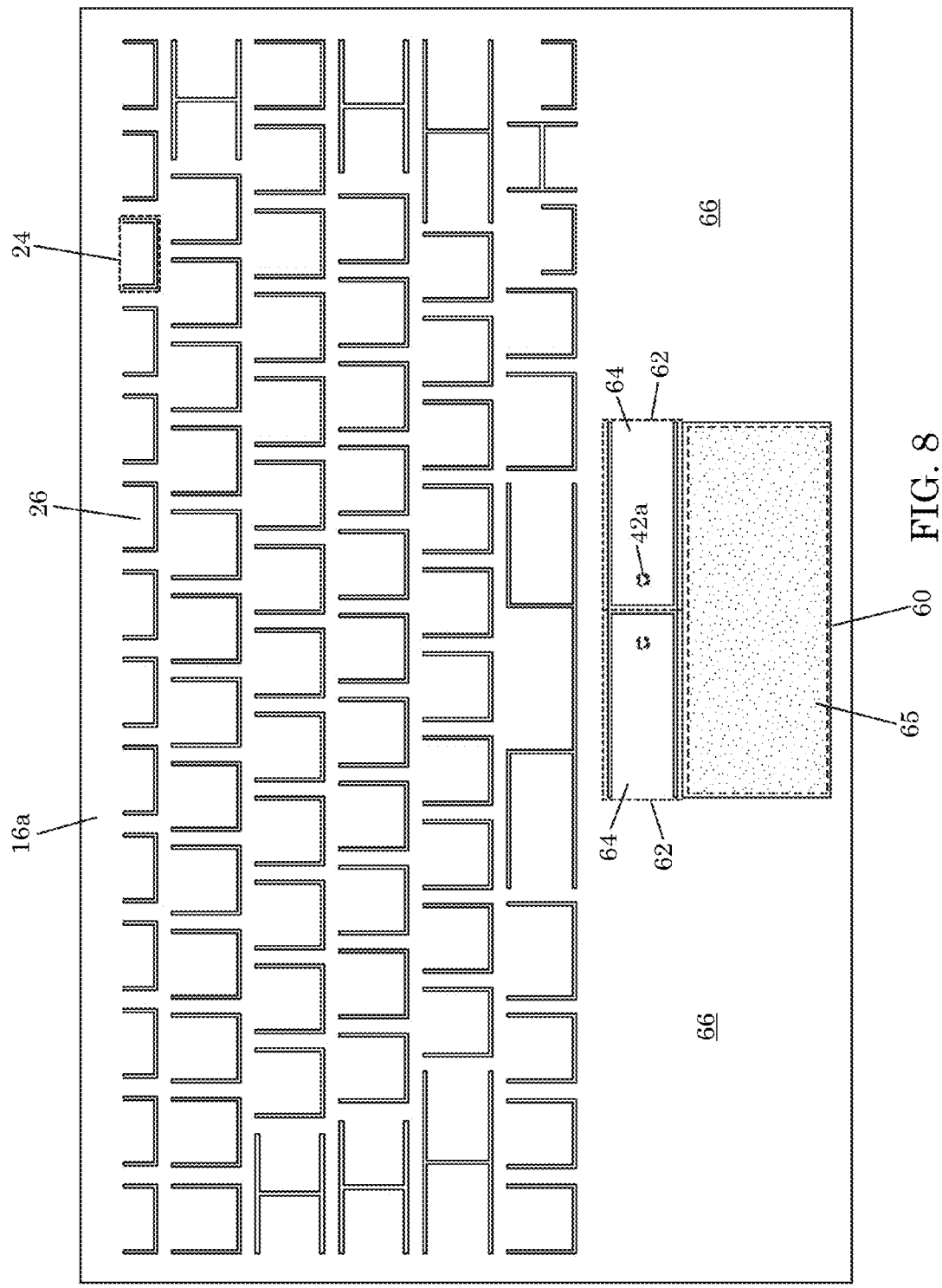
FIG. 8 is a top view of a glass keyboard including touchpad functionality.

As an example, FIG. 8 shows a patterned glass sheet 16a having a glass touchpad surface 60 and glass buttons 62 adjacent to the glass touchpad surface 60. An integrated board with touch sensors (or touchpad sensor layer) 65 may be adhered to the glass touchpad surface 60 to form a touchpad. In one embodiment, each glass button 62 is made of one or more cantilevered glass tabs 64, which are integral sections of the patterned glass sheet 16a. The glass tabs 64 may be formed in the patterned glass sheet 16a using any of the slot shapes shown in FIGS. 3A-3C or another slot shape not specifically described.

The patterned glass sheet 16a may be used in lieu of the previously described patterned glass sheet 16 (in FIG. 2) to provide the glass keyboard 10 with touchpad functionality. The glass keyboard 10 will need to be further modified to include contact pads (e.g., 42a) below the glass buttons 62 for transmission of contact pressure to corresponding contact pads of the conductive layer when the glass tabs 64 are deflected off the plane of the patterned glass sheet 16a. The areas 66 of the patterned glass sheet 16a adjacent to the glass touchpad surface 60, i.e., where the glass keys are not located, may function as palm rests. The protective layer used underneath the patterned glass sheet 16a may have the characteristics described above for a protective layer. In some cases, the protective layer used underneath the patterned glass sheet 16a may contain graphic printings in the area corresponding to the palm rests 66. The graphic printings may be commercial logos, for example.

While the invention has been described with a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A glass keyboard, comprising:
   a patterned glass sheet having a plurality of glass keys arranged in a keyboard layout, each of the glass keys comprising one or more cantilevered glass tabs integrally formed in the patterned glass sheet, each glass tab being deflectable from a plane of the patterned glass sheet;
   a conductive layer arranged in opposing and spaced-apart relation to the patterned glass sheet, the conductive layer having a plurality of contact pads in positions corresponding to the glass tabs;
   a plurality of pressure pads disposed between the cantilevered glass tabs and the contact pads and configured to selectively transfer contact pressure from the cantilevered glass tabs to the contact pads when the cantilevered glass tabs are selectively deflected from the plane of the patterned glass sheet, the pressure pads being compressible; and
   a tip structure attached to each pressure pad for contacting the corresponding contact pad of the conductive layer when the corresponding cantilevered glass tab is deflected against the pressure pad.

2. The glass keyboard of claim 1, wherein a plurality of slots is provided in the patterned glass sheet, and wherein the slots define the cantilevered glass tabs in the patterned glass sheet.

3. The glass keyboard of claim 1, further comprising a protective layer applied to a side of the patterned glass sheet.

4. The glass keyboard of claim 3, wherein the protective layer comprises a sheet of film having a plurality of portions configured to deflect with the cantilevered glass tabs.

5. The glass keyboard of claim 3, wherein the protective layer comprises a plurality of film tabs individually applied to the cantilevered glass tabs.

6. The glass keyboard of claim 3, wherein the protective layer comprises character printings corresponding to the glass keys.

7. The glass keyboard of claim 3, wherein the protective layer comprises an opaque or semi-opaque film.

8. The glass keyboard of claim 3, wherein the protective layer comprises a hard coat film.

9. The glass keyboard of claim 1, wherein the patterned glass sheet has a thickness of less than 2.0 mm.

10. The glass keyboard of claim 1, wherein the patterned glass sheet has a surface compressive strength of at least 300 MPa.

11. The glass keyboard of claim 1, wherein the patterned glass sheet has a compressively stressed region near at least one of its surfaces, and wherein a layer depth of the compressively stressed region is at least 20 microns.

12. The glass keyboard of claim 1, wherein the patterned glass sheet is made of a chemically strengthened glass.

13. The glass keyboard of claim 1, wherein the pressure pads are made of an elastic material.

14. The glass keyboard of claim 1, wherein the tip structure is made of an elastomer or metal.

15. The glass keyboard of claim 1, further comprising a plurality of walls positioned to support the patterned glass sheet at areas of the patterned glass sheet in between the cantilevered glass tabs.

16. The glass keyboard of claim 15, wherein the walls and contact pads are arranged in a single layer between the patterned glass sheet and the conductive layer.

17. The glass keyboard of claim 1, further comprising a glass touchpad surface defined in the patterned glass sheet and a touchpad sensor layer underneath the glass touchpad surface, the glass touchpad surface and touchpad sensor layer forming a touch pad.

18. The glass keyboard of claim 17, wherein the patterned glass sheet further comprises at least one glass button adjacent to the glass touchpad surface, the at least one glass button comprising one or more cantilevered glass tabs formed integrally in the patterned glass sheet.

19. A glass keyboard, comprising:
   a patterned glass sheet having a plurality of glass keys arranged in a keyboard layout, each of the glass keys comprising one or more cantilevered glass tabs integrally formed in the patterned glass sheet, each glass tab being deflectable from a plane of the patterned glass sheet;
   a conductive layer arranged in opposing and spaced-apart relation to the patterned glass sheet, the conductive layer having a plurality of contact pads in positions corresponding to the glass tabs; and
   a plurality of pressure pads arranged in a layer between the patterned glass sheet and the conductive layer such that each pressure pad corresponds to a glass key, the pressure pads being configured to selectively transfer contact pressure from the cantilevered glass tabs to corresponding contact pads when a compression force is selectively applied to the pressure pads by selective deflection of the cantilevered glass tabs from the plane of the patterned glass sheet, the pressure pads being arranged such that there is a space between the bottom of the cantilevered glass tabs and the top of the pressure pads when the cantilevered glass tabs are undeflected, the cantilevered glass tabs being configured to deflect through the space to reach the pressure pads and apply the compression force to the pressure pads, the pressure pads being adapted to spring back when the compression force is removed.

* * * * *